(12) United States Patent
Johnson

(10) Patent No.: US 6,982,036 B2
(45) Date of Patent: Jan. 3, 2006

(54) CHEMICALLY ENHANCED PRIMARY SLUDGE FERMENTATION METHOD

(75) Inventor: Bruce R. Johnson, Boise, ID (US)

(73) Assignee: CH2M Hill, Inc., Englewood, CO (US)

( * ) Notice: Subject to any disclaimer, the term of this patent is extended or adjusted under 35 U.S.C. 154(b) by 38 days.

(21) Appl. No.: 10/853,472

(22) Filed: May 24, 2004

(65) Prior Publication Data

US 2005/0016920 A1   Jan. 27, 2005

Related U.S. Application Data

(60) Provisional application No. 60/489,065, filed on Jul. 21, 2003.

(51) Int. Cl.
*C02F 3/00*      (2006.01)

(52) U.S. Cl. ............. 210/607; 210/906; 210/723; 210/724; 210/725; 210/732; 210/768

(58) Field of Classification Search ........... 210/607, 210/906, 723–725, 732, 768
See application file for complete search history.

(56) References Cited

U.S. PATENT DOCUMENTS

| | | | |
|---|---|---|---|
| 4,188,289 A | 2/1980 | Besik | |
| 4,559,142 A * | 12/1985 | Morper | 210/607 |
| RE32,429 E | 6/1987 | Spector | |
| 4,721,569 A | 1/1988 | Northrop | |
| 4,867,883 A | 9/1989 | Daigger et al. | |
| 4,874,519 A | 10/1989 | Williamson | |
| 4,999,111 A | 3/1991 | Williamson | |
| 5,022,993 A | 6/1991 | Williamson | |
| 5,098,567 A | 3/1992 | Nishiguchi | |
| 5,128,040 A | 7/1992 | Molof et al. | |
| 5,182,021 A | 1/1993 | Spector | |
| 5,288,405 A | 2/1994 | Lamb, III | |
| 5,376,275 A | 12/1994 | Raper | |
| 5,380,438 A | 1/1995 | Nungesser | |
| 5,601,719 A | 2/1997 | Hawkins et al. | |
| 5,651,891 A | 7/1997 | Molof et al. | |
| 5,733,455 A | 3/1998 | Molof et al. | |
| 5,733,456 A | 3/1998 | Okey et al. | |
| 5,759,401 A | 6/1998 | Boussely et al. | |
| 5,853,588 A | 12/1998 | Molof et al. | |
| 5,853,589 A | 12/1998 | Desjardins et al. | |
| 6,113,788 A | 9/2000 | Molof et al. | |
| 6,217,768 B1 | 4/2001 | Hansen et al. | |

(Continued)

OTHER PUBLICATIONS

Johnson (2002) Technical Paper re City of Bosie, West Boise Water Treatment Facility.

(Continued)

*Primary Examiner*—Chester T. Barry
(74) *Attorney, Agent, or Firm*—Swanson & Bratschun LLC

(57) ABSTRACT

A method of treating wastewater to increase effluent volatile fatty acid content consisting of providing wastewater to a primary treatment vessel and adding a select quantity of a chemical, typically an aluminum or iron salt, to the wastewater, enhancing the separation of organic matter. Separated organic matter is then removed from the chemically treated wastewater forming a primary sludge and a primary effluent. A portion of the primary sludge is fermented to form a volatile fatty acid rich liquor. The volatile fatty acid rich liquor may then be used with the primary effluent, directed to a bioreactor, thereby forming a volatile fatty acid enriched bioreactor feed. The volatile fatty acid enriched influent may be further treated through known biological phosphorous and nitrogen removal methods.

18 Claims, 3 Drawing Sheets

U.S. PATENT DOCUMENTS

| | | |
|---|---|---|
| 6,312,599 B1 | 11/2001 | Reid |
| 6,338,799 B1 | 1/2002 | Fukushima et al. |
| 6,387,264 B1 | 5/2002 | Baur |
| 6,406,628 B1 | 6/2002 | Chang et al. |
| 6,406,629 B1 | 6/2002 | Husain et al. |
| 6,485,645 B1 | 11/2002 | Husain et al. |
| 6,656,377 B2 | 12/2003 | Hassick et al. |
| 2002/0066701 A1 | 6/2002 | Baur |
| 2002/0185435 A1 | 12/2002 | Husain et al. |

OTHER PUBLICATIONS

Johnson (2004) Phosphorous Removal Special Studies Presentation.

* cited by examiner

CHEMICALLY ENHANCED PRIMARY SLUDGE FERMENTATION METHOD

RELATED APPLICATION DATA

This application claims benefit of U.S. Provisional Application Ser. No. 60/489,065, filed Jul. 21, 2003, entitled "Chemically Enhanced Primary Sludge Fermentation;" which application is incorporated herein in its entirety by reference.

TECHNICAL FIELD

The present invention relates to wastewater treatment, and more particularly to a method of treating wastewater to increase effluent volatile fatty acid content promoting effective biological nutrient removal.

BACKGROUND ART

It is often a primary goal of wastewater treatment to reduce phosphorous and nitrate levels in the treated wastewater, allowing the treated wastewater to be discharged to the environment. Many governmental bodies have introduced strict wastewater treatment plant effluent phosphorous and nitrate level requirements, which requirements can be quite difficult to reach with traditional treatment techniques.

Phosphorous can be introduced into a water system via human waste, agricultural and urban runoff, fertilizers and certain detergents. Nitrate is typically introduced through the oxidation of ammonia in biological wastewater treatment processes. High levels of biologically available phosphorous and nitrate in treated wastewater that is discharged into the environment can lead to eutrophication of lakes, rivers and estuaries. Certain specific wastewater treatment techniques have been developed which can minimize the phosphorous and nitrate content of treated wastewater. Two commonly employed methods of phosphorous reduction are chemically enhanced primary treatment (CEPT) and biological phosphorous removal (BPR). Nitrate reductions are typically accomplished through biological action in non-aerated zones of bioreactors. In these non-aerated zones, nitrate is used as an electron acceptor by microorganisms. Nitrate may be used in place of oxygen under non-aerobic conditions. As the micoorganisms consume soluble organic matter in the non-aerated zones, they reduce soluble nitrate to nitrogen gas. The nitrogen gas is then released to the atmosphere. In addition to nitrate reduction in the plant effluent, nitrate reductions are also typically needed in BPR systems. BPR systems require anaerobic zones to function. A non-aerated zone can be either anerobic and anoxic. The difference being in the nitrate levels present in the zone. A non-aerated zone with little to no nitrate can be considered anaerobic. A non-aerated zone with significant levels of nitrate is considered to be anoxic. Since BPR requires anaerobic zones, the removal of nitrate (if present) is a key part of the process.

CEPT is a process in which chemicals, typically metal salts and/or polymers in the form of organic polyelectrolytes are added to wastewater. Often, the chemicals are added after screening and sometimes after de-gritting. The chemicals may be added in the primary sedimentation basins of a wastewater treatment plant or in a dedicated CEPT tank. The chemicals utilized in CEPT are the same as are commonly added in potable water treatment, for example, ferric chloride, ferrous chloride, ferrous sulfate, polyaluminum chloride (PACL), and aluminum sulfate (alum).

The chemicals added to the wastewater cause organic matter, including phosphorous ($PO4^{-3}$), to precipitate and clump together via the processes of coagulation and flocculation. The particle aggregates, or flocs, settle faster than occurs in an untreated primary sedimentation basin, thereby enhancing primary wastewater treatment efficiency as measured by the removal of solids, organic matter and nutrients, including phosphorous and nitrogen, from the wastewater. Metal salts also promote the removal of phosphorous by facilitating chemical precipitation of soluble phosphorous in solution, where phosphorous bound within the precipitate settles with the sludge and can be removed along with the sludge.

The dosage of the chemical added in a CEPT facility can be varied to accomplish the removal of either a portion or substantially all of the soluble phosphorous content of the wastewater. This may be done in a manner that will provide responsive and reliable control of the discharge of phosphorus from a wastewater treatment facility.

Another advantage of CEPT systems is that they are capable of significantly reducing the TSS and BOD load to a downstream biological treatment system. This allows the biological system to be either sized with smaller tankage and aeration systems, thus reducing capital and operating costs, or allows increasing the treatment capacity of existing biological systems.

Three primary drawbacks are associated with CEPT. First, the use of chemicals in primary treatment can substantially increase the cost of primary treatment. Second, the amount of chemicals necessary to provide coagulation, flocculation and precipitation sufficient to meet effluent phosphorous goals without substantial secondary treatment will result in increased primary sludge production. According to Baur, U.S. Pat. No. 6,387,264, the use of "metal salts . . . may not only be expensive, but it also produces a chemical sludge that tends to be "fluffy," thereby increasing overall sludge volume." A higher overall sludge volume makes it harder to remove water from the sludge, which also makes the sludge harder to dispose of, thereby increasing disposal costs. Third, the increased BOD removal associated with CEPT reduces the amount of BOD available in the secondary system that can be used to remove nitrate from solution. This can increase nitrate levels in the effluent and hinder the development of a BPR system. Other drawbacks of CEPT are the need for extra storage space for the chemicals, the chemicals used in the CEPT process, such as ferric chloride, tend to be highly corrosive, and having such chemicals onsite at the wastewater treatment facility increases safety concerns and liability exposure for the plant.

BPR is an alternative phosphorous removal technique, which relies upon the actions of specific microorganisms to minimize the phosphorous content of wastewater treatment plant effluent. Many types of microorganisms contribute to removing phosphorous in the BPR process. As a group, the key microorganisms are known as phosphorous accumulating organisms (PAOs). Many configurations of BPR treatment plants are known in the art. All BPR treatment methods and facilities, however, share the following common features: the wastewater is treated in an anaerobic zone having organisms that release phosphorous and consume volatile fatty acids to create energy stores in the form of polyhydroxylalkonates (PHAs). The wastewater is treated in one or more aerobic zones having organisms which also metabolize stored PHAs and uptake phosphorous. When there is also nitrate in the wastewater, the wastewater may also be treated in one or more anoxic zones having organisms which reduce nitrate and metabolize stored PHAs and uptake phosphorous. Different configurations of BPR facilities known in the art will vary the number and order of each of the anaerobic, anoxic and aerobic zones. In addition, the retention time and/or flow rate through each zone can be varied along with specific effluent recycling patterns or treatment paths. The net result of treatment of wastewater with a BPR system is a reduction in the effluent phosphorous, and sometimes nitrate, to acceptable levels. All known BPR methods rely on the use of volatile fatty acids (VFAs), typically acetic acid, as an energy source for the PAOs which uptake phosphorous from the wastewater. BPR can not proceed without sufficient VFAs or with too much nitrate in the wastewater.

CEPT is not normally compatible with BPR or nitrate removal since, in addition to phosphate, significant particulate/colloidal biological oxygen demand (BOD) is removed from the wastewater in CEPT. Influent to a BPR process which is low in BOD may not have sufficient VFAs to support an effective PAO population or sufficient BOD to allow nitrate to be removed to the low levels required in BPR. Thus, use of CEPT followed by a downstream BPR or nitrate removal operation is contrary to conventional nutrient removal designs.

Since the PAOs which drive BPR rely on VFAs for energy, certain methods have been developed to increase the VFA content of the BPR influent. Acetic acid can be added directly to the BPR influent, although this is expensive. Alternatively, primary sludge from the primary treatment stage of wastewater treatment can be fermented to create VFAs for later use in BPR or nitrate removal. The fundamental biological processes of fermentation are hydrolysis and acetogenesis. The products of hydrolysis are soluble organic acids which contain carbon. Acetogenesis converts those acids to volatile fatty acids.

As noted above, the two techniques of phosphorous removal, CEPT and BPR, are considered to be mutually exclusive. For example, Baur teaches a fermentation and thickening process that generates a supernatant having a concentration of VFAs suitable for driving a BPR process. Baur, however, presents the fermentation/BPR process as a superior alternative to CEPT with metal salts.

Similarly, Husain, U.S. Pat. No. 6,485,645, teaches a BPR method and apparatus featuring the use of a membrane filter to separate an effluent lean in phosphorous from a liquid rich in rejected solids and organisms in the BPR anoxic zone. According to Husain, CEPT, as an alternative treatment method is less desirable than BPR since, "chemical precipitation methods . . . result in high chemical costs, high sludge production and a high level of metallic impurities in the sludge."

Thus, there exists a need in the art for a wastewater treatment method which combines the advantages of CEPT with the production of sufficient VFAs/BOD to support secondary BPR treatment.

In a similar manner, practicing CEPT with a downstream biological nitrate removal system is normally considered to be counter-productive. CEPT will remove a greater fraction of the biodegradable organic material needed to reduce nitrate. Similarly to the situation with phosphorus, there also exists a need to combine the advantages of CEPT with the supply of sufficient BOD to support effective nitrate reduction.

SUMMARY OF THE INVENTION

The need in the art is met by a method of treating wastewater to increase effluent volatile fatty acid content. The method consists of providing wastewater to a primary treatment vessel and adding a select quantity of a chemical, typically a metal salt, and possibly flocculants, to the wastewater, enhancing the separation of suspended organic matter. Next, organic matter is removed from the chemically treated wastewater forming a primary sludge and a primary effluent. A portion of the primary sludge is then fermented to form a volatile fatty acid rich liquor. The character of the sludge produced by a CEPT system allows it to produce higher levels of VFAs. This is a result of both the higher quantity of sludge produced and of the inclusion of higher levels of colloidal organic matter within the sludge. The small size of the colloidal particles make them especially susceptible to conversion to VFAs, thus increasing the overall production of VFAs per unit mass of primary sludge. Next, a portion of the volatile fatty acid rich liquor is mixed with a portion of the primary effluent, to form a volatile fatty acid enriched effluent which is particularly well suited to be a bioreactor influent. The volatile fatty acid enriched effluent may be subsequently treated through known biological phosphorous and nitrate removal methods.

The metal salt used in the primary treatment of the wastewater can be an aluminum salt, an iron salt or a polymer typically selected from the following group: aluminum sulfate, polyaluminum chloride (PACL), ferrous sulfate, ferrous chloride, and ferric chloride. The select quantity of the chemical added to the wastewater may be selected to cause a select increase in the quantity and quality of primary sludge formed in the separating step. Simultaneously, the quantity of the chemical added to the wastewater may be selected to remove a select quantity of phosphorous from the wastewater, resulting in a select phosphorous level in the primary effluent. Preferably, after the fermenting and mixing steps, the volatile fatty acid enriched effluent will have a ratio of volatile fatty acid content to orthophosphate content by weight equal to or greater than 7:1. The primary sludge may be fermented in the fermentation step for a period of time sufficient to produce about 0.1 or greater pounds of volatile fatty acid for each pound of primary sludge fermented. The period of time necessary to ferment the primary sludge to achieve the above volatile fatty acid yield may be between 2 and 8 days.

In an alternative embodiment of the invention, the volatile fatty acid enriched effluent may be treated with a BPR process to reduce the phosphorous content of a secondary effluent.

In another alternative embodiment of the invention, the volatile fatty acid enriched effluent may be treated in a biological nitrate removal process to reduce the nitrate content in the secondary effluent.

Another alternative embodiment of the invention is an apparatus for treating wastewater consisting of a primary treatment vessel receiving wastewater from a source and a settling tank or pool, thickening tank, filter, centrifuge or other apparatus operatively associated with the primary treatment vessel for the separation of organic matter. The apparatus also includes a source of a chemical for adding the chemical to the wastewater in the primary treatment vessel and a fermenter receiving primary sludge from the primary treatment vessel to ferment the primary sludge and create a volatile fatty acid rich liquor. Alternatively, the apparatus where fermentation occurs can be the primary treatment vessel. The apparatus also includes a mixing junction receiving a select portion of the volatile fatty acid rich liquor with a select portion of the primary effluent, thereby creating a volatile fatty acid enhanced effluent. The apparatus may further consist of a BPR system receiving the volatile fatty acid enhanced effluent as influent and creating a phosphate reduced wastewater through biological action. The apparatus may further consist of a biological nitrate removal system receiving volatile fatty acids enhanced effluent as influent to improve removal of nitrate.

The fermenter may consist of a gravity thickener in fluid communication with the primary treatment vessel and a fermentation tank in fluid communication with the gravity thickener. The BPR system may consist of an anaerobic zone receiving the volatile fatty acid enhanced effluent and having organisms therein which release bound phosphorous and uptake volatile fatty acids to create energy stores; possibly an anoxic zone receiving an effluent from the anaerobic zone, the anoxic zone having organisms which metabolize the energy stores and uptake phosphorous; and an aerobic zone receiving an effluent from the anoxic or aneaerobic zones, the aerobic zone having organisms which metabolize the energy stores and uptake phosphorous. The fermentor may also supply VFA rich liquor to a biological nitrate removal system where a portion of the microbial population will use the VFAs as a BOD source to reduce nitrate to nitrogen gas.

DETAILED DESCRIPTION OF THE PREFERRED EMBODIMENT

Figure 1:
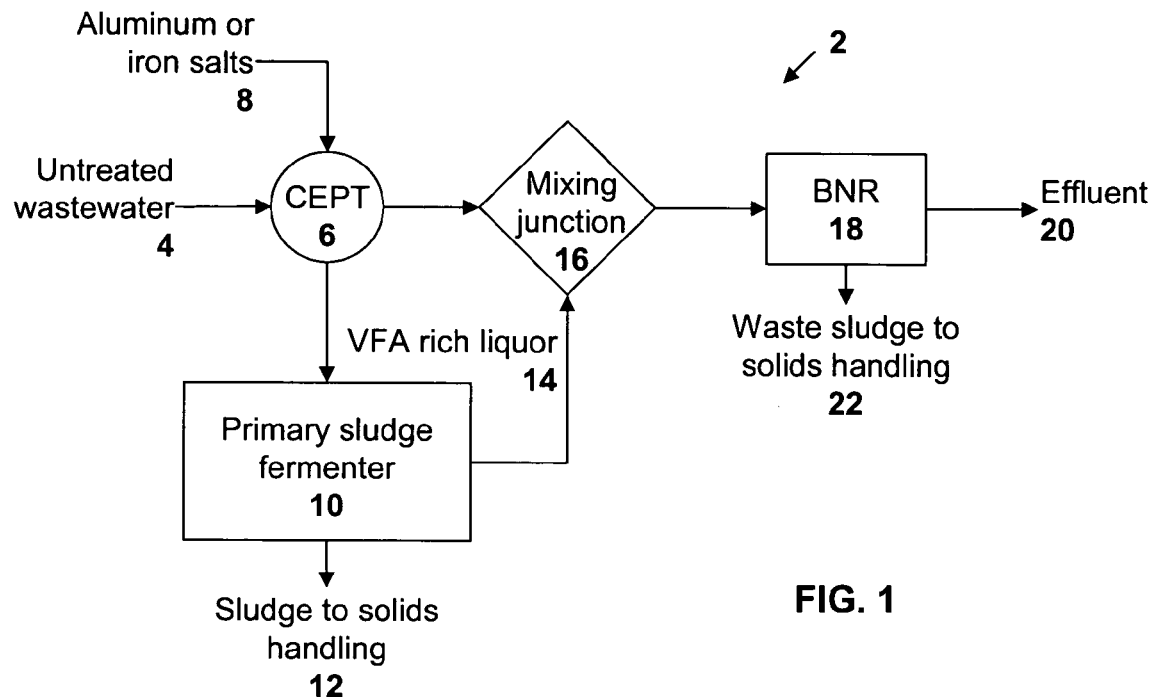
FIG. 1 is a schematic representation of a wastewater treatment facility suited for implementation of the invention.

FIG. 1 is a schematic representation of a wastewater treatment facility 2 suited for implementation of the process of the invention. The wastewater treatment method commences with a source of untreated or preliminary treated wastewater 4 which is provided to a primary treatment vessel 6. Metal salts, which can be iron or aluminum salts and possibly flocculants, are provided from a source of metal salts 8 to the primary treatment vessel 6 in a chemically enhanced primary treatment (CEPT) step. The chemical added in the CEPT step is typically stored in an aqueous or other solution in the source of metal salts 8 which can be a simple industrial tank. The chemical may be injected into a feed pipe between the source of untreated or preliminary treated wastewater 4 and the primary treatment vessel 6 or added directly to the primary treatment vessel. Although not shown on FIG. 1, it may be preferable to add the chemical to the wastewater in one or more separate mixing tanks or mixing chambers upstream of the primary treatment vessel 6. Preferably the chemical is dosed continuously at a feed rate based upon the flow rate of the input wastewater. Continuous dosing can be accomplished and controlled with a dosing or metering pump. The dosing rate can be selected and modified as needed to maintain a select chemical to wastewater concentration. Alternatively, a chemical could be added continuously through a valve or metered valve with a lesser degree of concentration control. In addition, liquid or solid chemicals could be manually added directly to the wastewater in or prior to the primary treatment vessel. For example, the manual measurement and addition of a select quantity of chemical might be useful in a batch treatment step.

The chemicals added in the CEPT step facilitate removal of organic matter and phosphorous from the untreated wastewater by causing the colloidal and suspended particles in the untreated wastewater to clump together through the processes of coagulation and flocculation. The particle aggregates or flocs settle faster, thereby enhancing treatment efficiency measured by the quantity of solids, organic matter and nutrients removed from the wastewater over a given period of time. The chemicals added also cause precipitation of some of the phosphorous dissolved in the untreated wastewater. Upon completion of coagulation, flocculation and precipitation in the primary treatment vessel 6, the wastewater can be separated into primary sludge and primary effluent components. Typically, the separation will occur by allowing the settling of the primary sludge to the bottom of the primary treatment vessel 6. Alternatively, a filter, centrifuge or other separation apparatus could be employed to separate the primary sludge from the primary effluent.

After separation, some or all of the primary sludge can be fermented in a fermenter 10. The products of the fermentation step are a fermented sludge which can be removed to solids handling 12 and a volatile fatty acid (VFA) rich liquor 14 which can be mixed with the primary effluent in a mixing junction 16 to form a volatile fatty acid enriched effluent. VFA rich liquour 14 may also be directed to specific locations within a downstream BPR process to enhance performance. The mixing junction 16 can be a separate chamber, but more typically would be merely a junction in the conduit of flow path between the primary treatment vessel 6 and any secondary treatment vessels or alternatively the initial chamber of any secondary treatment vessel.

Alternatively, it is also possible to accomplish fermentation in the CEPT unit itself. This is done by storing primary sludge in the CEPT unit for periods of time similar to that used in external fermentation and recycling a portion of the sludge from the CEPT unit back to the CEPT feed to elutriate the VFAs from the liquor.

The volatile fatty acid enriched effluent may be treated in a secondary biological nutrient removal (BNR) apparatus 18 resulting in a nitrogen and/or phosphorous reduced effluent 20. Phosphorous contained in a waste sludge from the BNR apparatus 18 can be removed from the system to a waste sludge handling system 22 and disposed of.

Figure 2:
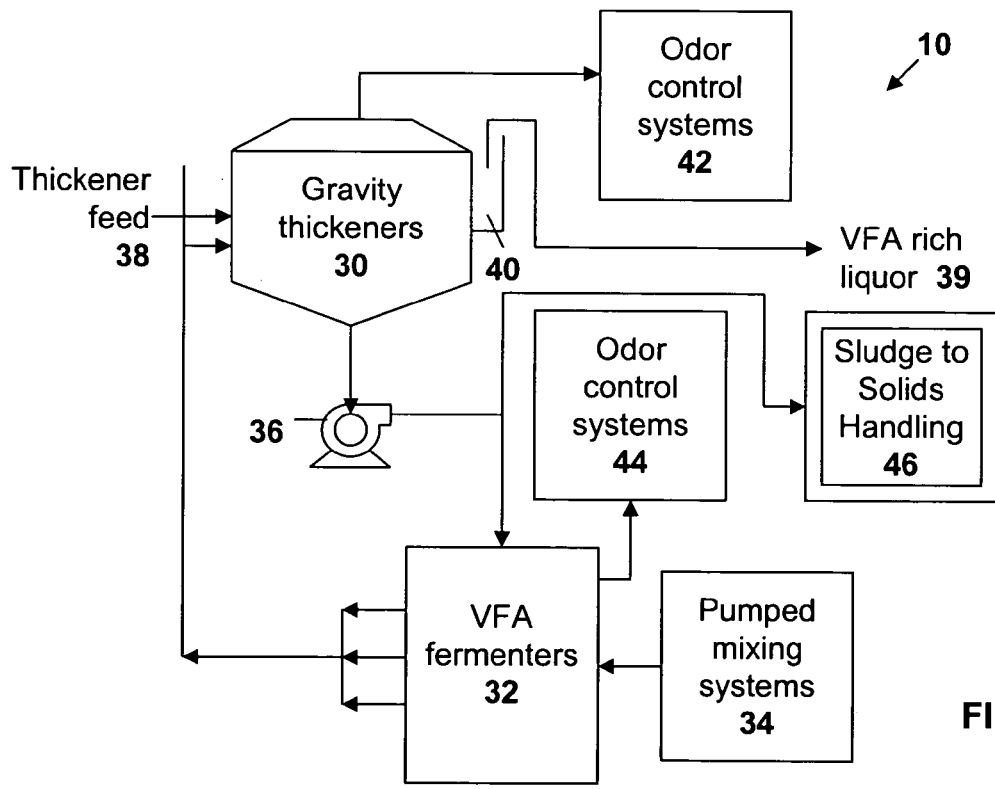
FIG. 2 is a schematic representation of a typical fermenter.

Many variations of fermentation systems suitable for use as the fermenter 10 are known in the art. FIG. 2 schematically illustrates one suitable fermenter 10. The fermenter 10 consists of one or more gravity thickeners 30 receiving primary sludge from the primary treatment vessel 6. The gravity thickener 30 is operatively connected to one or more fermentation tanks 32 and an associated mixing system 34. Thickened sludge from the gravity thickeners 30 can be pumped to the fermnenters by the action of pump 36 where the sludge can be held for a select detention time. A portion of the pumped sludge is discharged to solids handling 46 The fermented sludge can then flow back by gravity to the thickener influent feed 38 where it may be diluted and then rethickened, thus elutriating VFAs. Gravity thickener overflow consisting of a VFA rich liquor 39 can be taken from the overflow outlet 40 of the gravity thickener 30 and, as shown on FIG. 1, directed to the mixing junction 16 for mixing with the primary effluent to form a VFA enhanced effluent. Typically, as shown on FIG. 2, odor control systems 42, 44 will be necessary to reduce objectionable odors associated with the fermentation process.

Figure 3:
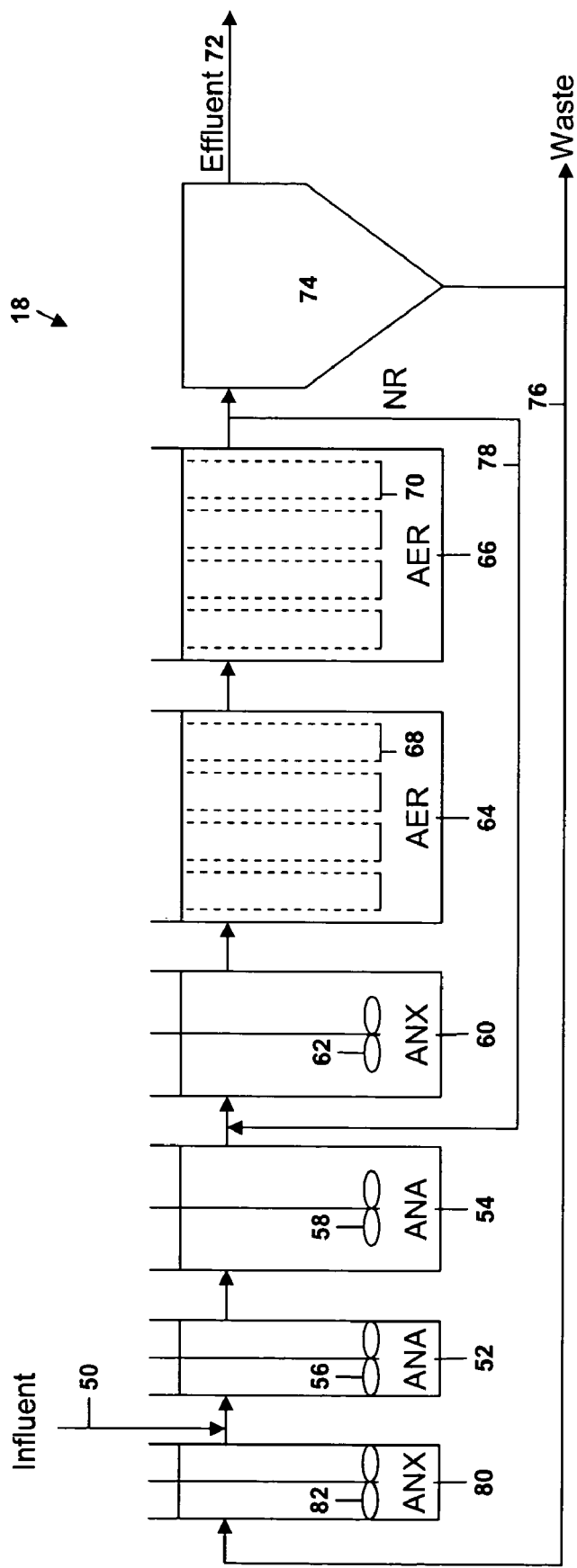
FIG. 3 is a schematic representation of a typical BPR apparatus.
Figure 4:
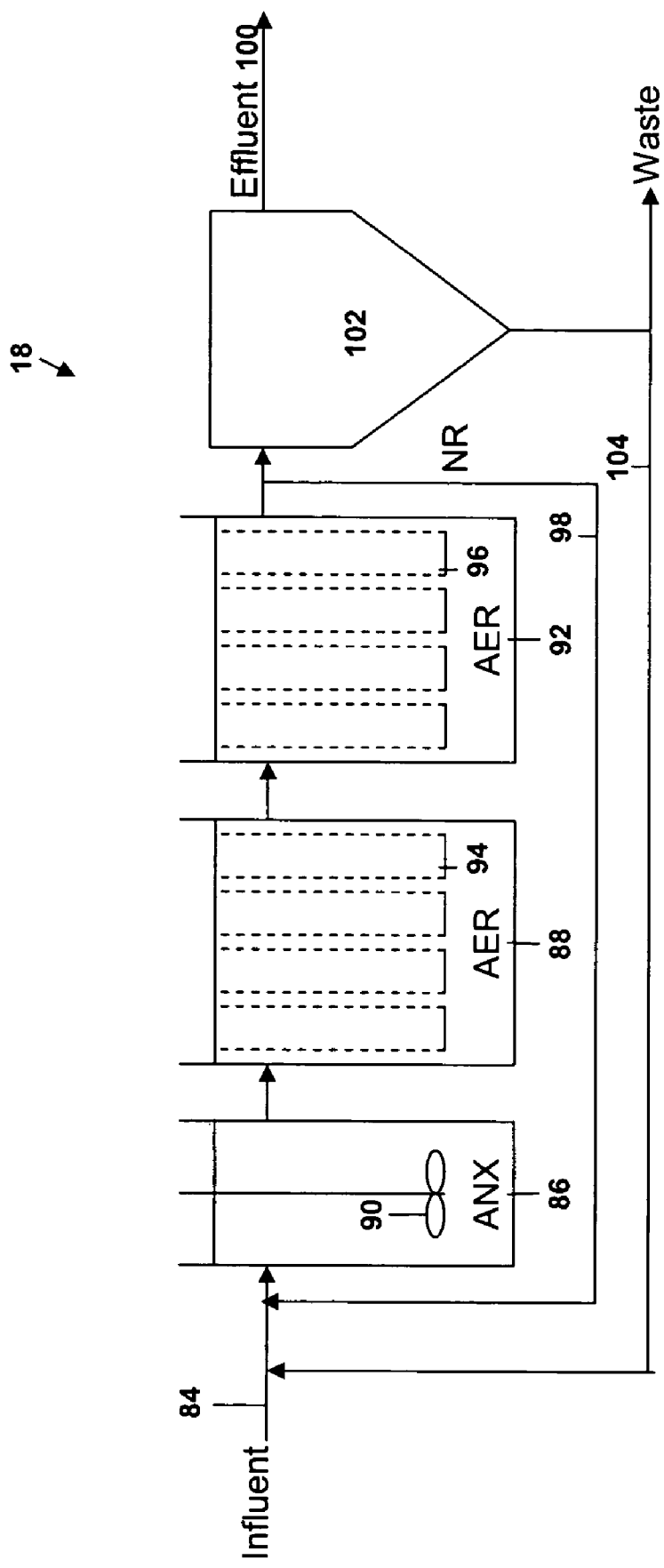
FIG. 4 is a schematic representation of a typical biological nitrate removal apparatus.

The BNR apparatus 18 of FIG. 1 can be any suitable biological nutrient removal apparatus known in the art. A representative biological phosphorus removal (BPR) apparatus is schematically depicted in FIG. 3. The apparatus depicted in FIG. 3 is the Johannesburg (JHB) Process Configuration. The invention is not limited to this BPR apparatus configuration, rather the invention is suitable for use with any BPR apparatus configuration. Similarly, a representative biological nitrogen removal (BNR) apparatus is schematically depicted in FIG. 4. The apparatus depicted in FIG. 4 is the Modified Ludzac Ettinger (MLE) Process Configuration. The invention is not limited to this BNR apparatus configuration, rather the invention is suitable for use with any BNR apparatus configuration The BPR apparatus 18 depicted in FIG. 3 consists of an influent inlet 50 in fluid communication with first and second anaerobic zones 52, 54 connected in series. Each anaerobic zone has an associated mixing apparatus 56, 58. Each anaerobic zone contains organisms which release phosphorous and uptake volatile fatty acids to create an energy source for later use. The second anaerobic zone 54 is in fluid communication with an anoxic zone 60 which also is associated with a mixing apparatus 62. The anoxic zone 60 receives effluent from the anaerobic zone 54 and the effluent is further processed by phosphorous accumulating organisms (PAOs) within the anoxic zone which uptake phosphorous and use the stored energy source. The effluent from the anoxic zone 60 is provided to a series of aerobic zones 64, 66 each of which are associated with an air supply 68, 70 for mixing and oxygenation. The effluent from the anoxic zone 60 is processed in the aerobic zones 64, 66 by aerobic PAOs which uptake phosphorous and use the stored energy source. The net result of the action of the PAOs within the BPR apparatus is a final effluent 72 which has a substantially reduced phosphorous content. The BPR apparatus 18 may include one or more secondary clarification tanks 74, various recirculation lines 76, 78 and a recirculation anoxic zone 80 with associated mixing apparatus 82. In any BPR process, parameters within the control of the operator such as flow rates and retention times in each zone can be manipulated to maximize the process efficiency.

The BNR apparatus 18 depicted in FIG. 4 consists of an influent inlet 84 in fluid communication with anoxic zone 86 connected in series with an aerobic zone 88. The anoxic zone has an associated mixing apparatus 90. The anoxic zone contains organisms which convert nitrate to nitrogen gas while consuming organic carbon. The effluent from the anoxic zone 86 is provided to a series of aerobic zones 88, 92 each of which are associated with an air supply 94, 96 for mixing and oxygenation. The effluent from the anoxic zone 86 is processed in the aerobic zones 88, 92 by microorganisms that convert ammonia to nitrate. A recirculation stream 98 from an aerobic zone to the anoxic zone transports the created nitrate to the anoxic zone where it will be converted to nitrogen gas. The net result of the action of the organisms with the apparatus is a final effluent 100 which has a substantially reduced nitrogen content. The BNR apparatus 18 may include one or more secondary clarification tanks 102 and various recirculation lines 104. In any BNR process, parameters within the control of the operator such as flow rates and retention times in each zone can be manipulated to maximize the process efficiency.

CEPT has not previously been considered compatible with biological nutrient removal since, in addition to phosphate, significant particulate/colloidal biological oxygen demand (BOD) is removed from the effluent fed into secondary BNR by the CEPT process. A low BOD feed to the BPR process will generally not have adequate BOD or VFAs to support an effective phosphorous accumulating organism (PAO) population. The reduced influent BOD will also reduce the amount of nitrate removed in the anoxic zones. The present invention is a method of using CEPT in conjunction with fermentation to produce an effluent suitable to support a BPR/BNR process.

As described above, CEPT is practiced with either aluminum or iron salts. The amount of metal salt added can be adjusted to tune the process in two complementary manners for phosphorus removal. First, the CEPT metal salt dosage can be adjusted to maintain a select level of phosphorous in the influent to the BPR process. An increase in the metal dosage will result in less phosphorous in the BPR feed. Second, adjusting the CEPT metal salt dosage in the same manner will increase the amount of organic matter (BOD) removed in primary treatment and fed to the fermenter 10. If more organic primary sludge is fed to the fermenter, more VFAs will be produced which can then be used to enhance the BPR process. An additional benefit of fermenting CEPT sludge is that the solid waste sludge fed to the fermentation step is much more biodegradable as a result of the high proportion of colloidal matter. The smaller organic particle size in CEPT sludge is more readily fermentable than the larger organic particle typical in primary sludge.

According to the present invention, there will be a metal salt dosage for any wastewater treatment plant influent where the reduction in BPR influent phosphorous levels and the simultaneous increase in influent VFAs created by this invention allows the BPR process to meet the plant's effluent phosphorous goals. This dosage could range from a relatively small dosage to the dosage required to fully remove soluble orthophosphate and colloidal matter. For example, a smaller dosage could be used when the untreated wastewater is relatively high in VFAs but low in phosphorous while a larger dosage could be used when the untreated wastewater has a high phosphorous to VFA ratio. Thus, the invention makes the BPR process applicable to a much wider range of wastewater treatment plants, especially those with a high phosphorous to biologically available carbon or VFA ratio.

Similarly, when the present invention is applied to a biological nitrogen removal system, the CEPT will allow a size reduction or capacity increase in the downstream biological nitrogen removal system. The VFAs produced by the fermentation step can be supplied to an anoxic zone to enhance the nitrate removal. The net result of the modification is an enhanced capability to remove nitrate in combination with a lower required tank volume.

Two metal salts are typically used for CEPT. The first is alum ($Al_2(SO_4)_3 \cdot 18H_2O$) and the second is ferric chloride ($FeCl_3$). Less commonly used chemicals for CEPT are ferrous sulfate, ferrous chloride and certain organic polyelectrolytes.

The use of a sufficient quantity of metal salts in the CEPT process can result in substantial initial phosphorous removal. Aggressive CEPT alone may allow a wastewater treatment plant to meet its ultimate effluent phosphorous content goals. As shown in Table 1 below, the inventor projects that a dosage of alum at 47 mg/L in a CEPT only process will result in a plant effluent having 1.0 mg of phosphorous per liter effluent, given the influent assumptions for flow, BOD, total Kjeldal nitrogen ("TKN"), and total phosphorous ("TP") shown in Table 1. This can be compared to a projected total effluent phosphorous of 3.0 mg of phosphorous per liter effluent if only BPR is performed given the same assumed influent parameters. By combining the CEPT and BPR process, the inventor projects, given the same assumed influent parameters, that a plant effluent having 1.0 mg of phosphorous per liter effluent can be obtained with approximately 18 mg/L of alum dosage in the CEPT portion of the process, which represents a significant reduction from the amount of alum required to achieve a similar level of total effluent phosphorous when only using CEPT to remove phosphorous from the influent.

TABLE 1

|  | BPR | CEPT | CEPT + BPR | CEPT + BPR + Ferm |
|---|---|---|---|---|
| Influent |  |  |  |  |
| Flow, MGD | 1 | 1 | 1 | 1 |
| BOD, mg/L | 200 | 200 | 200 | 200 |
| TKN, mg N/L | 39 | 39 | 39 | 39 |
| TP, mg P/L | 8 | 8 | 8 | 8 |
| CEPT Alum Dosage, mg/L | 0 | 47 | 18 | 12 |
| MLSS, mg/L | 2,800 | 1,800 | 2,500 | 2,800 |
| Effluent TP, mg/L | 3.0 | 1.0 | 1.0 | 1.0 |

Total effluent phosphorous of 1.0 mg phosphorous per liter of effluent would generally be considered an acceptable effluent phosphorous level. However, the sole reliance on only CEPT or on CEPT and BPR without fermentation to achieve this level has substantial costs. In particular, sole reliance on only CEPT or on CEPT and BPR without fermentation will result in higher solids disposal costs and greatly increased chemical acquisition, storage, and handling costs.

These higher solids disposal and chemical acquisition, storage, and handling costs associated with reliance upon either CEPT only or CEPT and BPR without fermentation can be minimized if CEPT and BPR are combined with fermentation. As noted above, sufficient VFAs in the bioreactor feed stream are necessary to support BPR. Typically, seven pounds of VFAs per pound of orthophosphate in the BPR influent are necessary to support the PAOs driving the BPR. Many wastewater treatment facilities do not have an influent which will support effective BPR. As noted above, in order to supplement existing VFAs, it is possible to add a primary sludge fermentation step that will produce VFAs from the primary sludge. Typically, the operational target for primary sludge fermentation is a solids retention time of between two and eight days. In this operating range, a primary sludge fermenter will typically produce between 0.1 and 0.2 pounds of VFAs per pound of volatile suspended solids (VSS) sent to the fermenter. Modeling runs were done assuming 0.2 pound VFAs per pound VSS production rate, which is at the high end from a fermentor operating as described above, because of the higher biodegradability of the sludge produced by the CEPT process.

As shown in Table 1, it is projected that in a CEPT and BPR process with fermentation, using an alum dosage of 12 mg/L in the CEPT step will result in an effluent with a TP of 1 mg/L, which is substantially equivalent to the effluent quality projected when 18 mg/L of alum is used during the CEPT step in the combined CEPT and BPR process without fermentation or when 47 mg/L of alum is used during a CEPT only process.

In sum, as projected above, a process that combines CEPT, BPR, and fermentation, as disclosed by applicant, can result in a satisfactory effluent phosphorous level of 1.0 total mg of phosphorous per liter of effluent with reduced alum additions compared to a process that uses just CEPT alone or in combination with BPR. In particular, the foregoing results can be achieved with a an alum dosage that is approximately one-fourth (¼) of the dosage required when the process uses only CEPT and that is approximately two-thirds (⅔) of the dosage required when the process uses CEPT and BPR without fermentation.

The use of metal salts in the CEPT process can also result in substantial reductions in the efficiency of nitrate removal in the downstream biological nitrogen removal (BNR) process, thus limiting the CEPT benefits of reduced bioreactor size or increased capacity. As summarized in Table 2 below, the inventor projects for a combination CEPT and BNR process that a dosage of alum at 40 mg/L during the CEPT process will result in a plant effluent having 9.2 mg of nitrate nitrogen per liter effluent, given the influent assumptions for flow, BOD, TKN, and TP shown in Table 2. This can be compared to a projected total effluent nitrate of 5.4 mg of nitrogen per liter effluent if only BNR is performed given the same assumed influent parameters.

TABLE 2

|  | BNR | CEPT + BNR | CEPT + BNR + Ferm |
|---|---|---|---|
| Influent |  |  |  |
| Flow, MGD | 1 | 1 | 1 |
| BOD, mg/L | 200 | 200 | 200 |
| TKN, mg N/L | 39 | 39 | 39 |
| TP, mg P/L | 8 | 8 | 8 |
| CEPT Alum Dosage, mg/L | 0 | 40 | 40 |
| MLSS, mg/L | 2,400 | 1,700 | 2,100 |
| Effluent Nitrate, mg/L | 5.4 | 9.2 | 5.1 |

As shown in Table 2, the mixed liquor suspended solids (MLSS) projected for a process that uses CEPT in combination with BNR is reduced 30% as compared to the base case of using BNR only. The reduction of MLSS is the normal benefit of the CEPT process. However, the application of CEPT in combination with BNR to achieve this MLSS level has substantial costs. In particular, the application of CEPT will result in increased effluent nitrate levels.

The higher nitrate levels associated with using CEPT in combination with BNR can be lowered if the CEPT and BNR processes are effectively combined with primary sludge fermentation. Typically, the operational target for primary sludge fermentation is a solids retention time of between two and eight days. In this operating range, a primary sludge fermenter will typically produce between 0.1 and 0.2 pounds of VFAs per pound of volatile suspended solids (VSS) sent to the fermenter. Modeling runs were done assuming a 0.2 pound VFAs per pound VSS production rate, which is at the high end from a fermentor operating as described above, because of the higher biodegradability of the sludge produced by the CEPT process. As shown in Table 2, it is projected that the combination of CEPT and BNR with primary sludge fermentation will result in an effluent nitrate level (5.1 mg/L), which is not only lower than the CEPT and BNR without fermentation option (9.2 mg/L), but is also, unexpectedly, lower than the base case with BNR only (5.4 mg/L).

As also shown in Table 2, in contrast to the results obtained when using CEPT and BNR without fermentation, the inventor projects that when using CEPT and BNR with fermentation instead of BNR alone, reductions in MLSS can be achieved without a corresponding increase in effluent nitrate.

The objects of the invention have been fully realized through the embodiments disclosed herein. Those skilled in the art will appreciate that the various aspects of the invention may be achieved through different embodiments without departing from the essential function of the invention. The particular embodiments are illustrative and not meant to limit the scope of the invention as set forth in the following claims.

What is claimed is:

1. A method of treating wastewater to increase effluent volatile fatty acid content comprising:
   providing a wastewater to a primary treatment vessel;
   adding a select quantity of a chemical to the wastewater to enhance separation of organic matter from the wastewater, wherein the select quantity of the chemical added to the wastewater is selected to cause at least one of a desired decrease in phosphorous concentration and a desired increase in the quantity of primary sludge removed in a removing step;
   removing separated organic matter from the chemically treated wastewater to form a primary sludge and a primary effluent;
   fermenting a portion of the primary sludge to form a volatile fatty acid rich liquor; and
   mixing the volatile fatty acid rich liquor with the primary effluent to form a volatile fatty acid enriched effluent.

2. A method of treating wastewater to increase effluent volatile fatty acid content comprising:
   providing a wastewater to a primary treatment vessel;
   adding a select quantity of aluminum sulfate to the wastewater to enhance separation of organic matter from the wastewater wherein the quantity of aluminum sulfate added to the wastewater is selected to attain in the wastewater, after the addition, a molar ratio of aluminum to phosphorus between 0.1 and 20;
   removing separated organic matter from the chemically treated wastewater to form a primary sludge and a primary effluent;
   fermenting a portion of the primary sludge to form a volatile fatty acid rich liquor; and
   mixing the volatile fatty acid rich liquor with the primary effluent to form a volatile fatty acid enriched effluent.

3. A method of treating wastewater to increase effluent volatile fatty acid content comprising:
   providing a wastewater to a primary treatment vessel;
   adding a select quantity of a chemical to the wastewater to enhance separation of organic matter from the wastewater;
   removing separated organic matter from the chemically treated wastewater to form a primary sludge and a primary effluent;
   fermenting a portion of the primary sludge to form a volatile fatty acid rich liquor; and
   mixing the volatile fatty acid rich liquor with the primary effluent to form a volatile fatty acid enriched effluent, wherein the volatile fatty acid enriched effluent has a ratio of volatile fatty acid content to ortho-phosphate content by weight equal to or greater than 7 to 1.

4. A method of treating wastewater to increase effluent volatile fatty acid content comprising:
   providing a wastewater to a primary treatment vessel;
   adding a select quantity of a chemical to the wastewater to enhance separation of organic matter from the wastewater;
   removing separated organic matter from the chemically treated wastewater to form a primary sludge and a primary effluent;
   fermenting a portion of the primary sludge to form a volatile fatty acid rich liquor for a period of time to produce greater than 0.1 pounds of a volatile fatty acid for each pound of primary sludge fermented; and
   mixing the volatile fatty acid rich liquor with the primary effluent to form a volatile fatty acid enrichment effluent.

5. The method of claim 4 wherein the period of time the primary sludge is fermented in the fermentation step is between 2 and 8 days.

6. A method of treating wastewater to reduce effluent phosphorus content comprising:
   providing wastewater to a primary treatment vessel;
   adding a select quantity of a chemical to the wastewater to enhance separation of organic matter from the wastewater;
   removing separated organic matter from the chemically treated wastewater to form a primary sludge and a primary effluent;
   fermenting a portion of the primary sludge to form a volatile fatty acid rich liquor;
   enriching a bioreactor influent with the volatile fatty acid rich liquor; and
   treating the enriched bioreactor influent with a biological phosphorus removal process to reduce a phosphorus content of the enriched bioreactor influent.

7. The method of claim 6 wherein the chemical is one of an aluminum salt, iron salt and a polymer.

8. The method of claim 6 wherein the select quantity of chemical added to the wastewater is selected to cause at least one of a desired decrease in phosphorous concentration and a desired increase in the quantity of primary sludge removed in the removing step.

9. The method of claim 6 wherein the chemical is aluminum sulfate and the quantity of aluminum sulfate added to the wastewater is selected to attain in the wastewater, after the aluminum sulfate addition, a molar ratio of aluminum to phosphorus between 0.1 and 20.

10. The method of claim 6 wherein the enriched bioreactor influent has a ratio of volatile fatty acid content to ortho-phosphate content by weight equal to or greater than 7 to 1.

11. The method of claim 6 wherein the primary sludge is fermented in the fermentation step for a period of time to produce greater than 0.1 pounds of the volatile fatty acid for each pound of primary sludge fermented.

12. The method of claim 6 wherein the period of time the primary sludge is fermented in the fermentation step is between 2 and 8 days.

13. A method of treating wastewater to reduce effluent total nitrogen content comprising:
   providing wastewater to a primary treatment vessel;
   adding a select quantity of a chemical to the wastewater to enhance separation of organic matter from the wastewater;
   removing separated organic matter from the chemically treated wastewater to form a primary sludge and a primary effluent;
   fermenting a portion of the primary sludge to form a volatile fatty acid rich liquor;
   enriching a bioreactor influent with the volatile fatty acid rich liquor; and
   treating the enriched bioreactor influent with a biological nitrogen removal process to reduce a nitrogen content of the enriched bioreactor influent.

14. The method of claim 13 wherein the chemical is one of an aluminum salt, iron salt and a polymer.

15. The method of claim 13 wherein the select quantity of chemical added to the wastewater is selected to cause at least one of a desired decrease in nitrogen concentration and a desired increase in the quantity of primary sludge removed in the removing step.

16. The method of claim 13 wherein the chemical is one of ferric chloride and aluminum sulfate and the quantity of the chemical added to the wastewater is selected to attain in the wastewater, after the chemical addition, a reduced level of colloidal material.

17. The method of claim 13 wherein the primary sludge is fermented in the fermentation step for a period of time to produce greater than 0.1 pounds of the volatile fatty acid for each pound of primary sludge fermented.

18. The method of claim 13 wherein the period of time the primary sludge is fermented in the fermentation step is between 2 and 8 days.

* * * * *